United States Patent [19]
Waschkuttis

[11] Patent Number: 5,379,592
[45] Date of Patent: Jan. 10, 1995

[54] CATALYTIC CONVERTER WITH IGNITION BURNER

[76] Inventor: Gerhard Waschkuttis, 134 Marine Cir., Pembroke Park, Fla. 33009

[21] Appl. No.: 121,975

[22] Filed: Sep. 15, 1993

Related U.S. Application Data

[63] Continuation of Ser. No. 781,621, Oct. 23, 1991, abandoned.

[51] Int. Cl.$^6$ .............................................. F01N 3/20
[52] U.S. Cl. ...................................... 60/286; 60/300; 60/303; 422/176
[58] Field of Search ................. 60/286, 303, 300; 422/176; 431/261, 326, 352

[56] References Cited

U.S. PATENT DOCUMENTS

| | | | |
|---|---|---|---|
| 3,159,201 | 12/1964 | Hottenroth | 431/261 |
| 3,716,996 | 2/1973 | Maruoka | 60/303 |
| 3,732,696 | 5/1973 | Masaki | 60/284 |
| 3,797,240 | 3/1974 | Inoue | 60/303 |
| 3,800,772 | 4/1974 | Gospodar | 60/300 |
| 3,804,597 | 4/1974 | Inoue | 60/303 |
| 3,854,288 | 12/1974 | Heitland | 60/284 |
| 3,945,802 | 3/1976 | Eckert | 60/284 |
| 4,538,985 | 9/1985 | Zwicker | 431/261 |
| 4,789,331 | 12/1988 | Kawamura | 431/352 |

FOREIGN PATENT DOCUMENTS

| | | |
|---|---|---|
| 1299005 | 9/1964 | Germany . |
| 3835939A1 | 5/1989 | Germany . |
| 3938785A1 | 6/1990 | Germany . |
| 1346154 | 2/1974 | United Kingdom . |

OTHER PUBLICATIONS

Waschkuttis GmbH brochure—Rußfilter-Systeme mit innovativer Technik.

*Primary Examiner*—Douglas Hart
*Attorney, Agent, or Firm*—Malin, Haley, DiMaggio & Crosby

[57] ABSTRACT

A cold start burner for prewarming components of an engine, especially for prewarming engine exhaust upstream of a catalytic converter. The device generally includes a pot shaped (i.e., cylindrical) burn chamber and a similarly shaped preheat chamber positioned concentrically around the burn chamber. An igniter is positioned within the burn chamber, and fuel is supplied into the burn chamber to be ignited by the igniter. Air is directed into the relatively cool preheat chamber and is then directed by the cooling of the preheat chamber to a plurality of openings extending through the side wall of the burn chamber. The air passes through the openings and into the burn chamber where it is preheated and then directed into an exhaust line upstream of the catalytic converter. Excess (i.e., unburned) fuel is collected in a reservoir formed within the burn chamber.

10 Claims, 1 Drawing Sheet

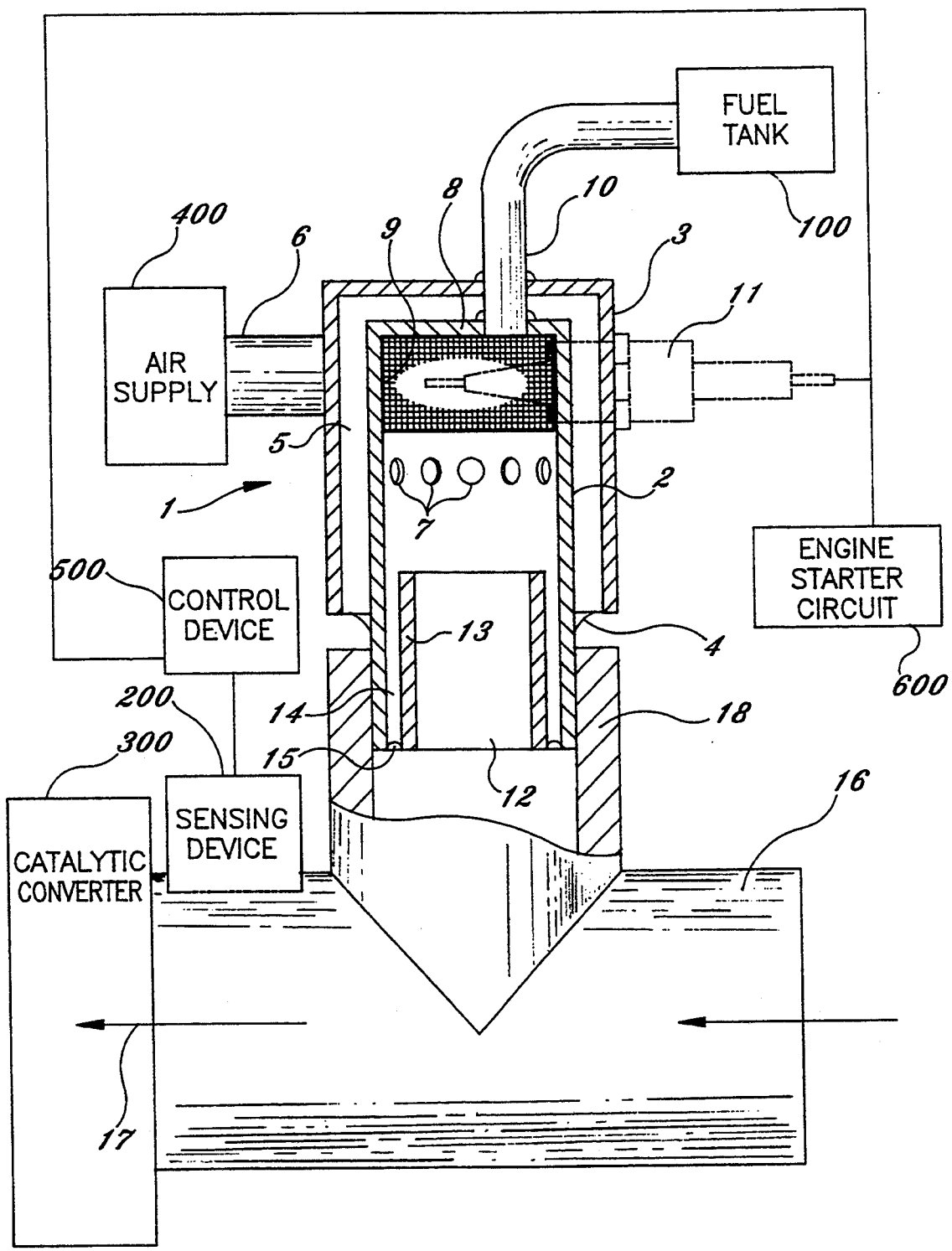

CATALYTIC CONVERTER WITH IGNITION BURNER

This is a continuation of application Ser. No. 07/781,621 filed Oct. 23, 1991, now abandoned.

BACKGROUND OF THE INVENTION

1. Field of the Invention

The instant invention is directed to a cold start burner that may be used to prewarm components of an engine such as, for example, to prewarm engine exhaust upstream of a catalytic converter.

2. Description of the Background Art

Catalytic converters typically employ a Platinum or a Rhodium coated webbing which significantly reduces the expelled pollutants at a minimum exhaust temperature of 230° to 250° C. The pollutants are nevertheless present, and particularly so in the case of small vehicles which use gasoline with a high oil content and which have a low exhaust temperature. The amount of pollutants escaping past the catalytic converters is even higher in the cold starting phase and, particularly, in two-stroke motors.

One conventional way of reducing the amount of pollutants has been to use a supplementary burner which is built into the exhaust system upstream of the catalytic converter. The burner is started when the vehicle is turned on, i.e., at ignition, and preheats the exhaust from the engine upstream of the catalytic converter.

The above noted conventional preheaters, such as for example, those described in U. S. Pat. No. 1,346,154 and the German Public Record DE 3835939 are complicated and, therefore, expensive, as well as being troublesome in operation.

SUMMARY OF THE INVENTION

Objects of the present invention are to provide an improved cold start burner which is simple, sturdy, and can be positioned in various places in a vehicle, without disturbing the emission temperature.

These and other objects are achieved according to the instant invention by employing a pot shaped casing as the preheat chamber, which chamber surrounds a similarly shaped burn chamber. Air is directed into the relatively cool preheat chamber and then into the burn chamber through a plurality of openings provided in the side of the burn chamber.

As a result of the above noted design, the instant invention is particularly effective in directing the prewarmed air towards the catalytic converter. The cold start burner generates relatively little heat, so it can be placed in almost any location in a vehicle, unlike the previously proposed cold start burners which give off relatively large amounts of heat and therefore require special exhaust systems and/or parts which may adversely affect the engine. In contrast, the present invention effectively and rapidly prewarms the air, so that there is a relatively quick prewarming of the catalytic converter and other engine components which require preheating.

The interior wall of the burn chamber, in the vicinity of the fuel supply, may be provided with a fuel absorbing and dispersing fleece, such as a stiff woven fiberglass matting. Measured drops of fuel enter the burn chamber adjacent the fleece. An igniting spark plug, such as the ones used in cold start burners for diesel motors, provides a very workable and also non polluting burn with a blue flame. The burner system requires pressurized air which is combusted and preheated. The fleece is preferably provided on the top and side walls of the burn chamber (inverted) above the air intake opening. This arrangement provides for a sufficient supply of oxygen to the burn chamber. Further, evaporation in the burn chamber and loss of fuel due to absorption are minimized.

The catalytic converter may be damaged if unburned fuel from the cold start burner remains in the catalytic converter. Thus, in the instant invention, in order to prevent any unburned fuel from entering the exhaust and, potentially, the catalytic converter, a conduit pipe is welded within the burn chamber to form a reservoir at the exhaust opening of the burn chamber to collect the unburned fuel.

The burn chamber of the present invention fits tightly within an upwardly projecting connection of the exhaust pipe upstream of the catalytic converter or other engine components which are to be prewarmed. A reversing valve or an electromagnetic valve may be positioned between the catalytic converter and the burn chamber to prevent exhaust from returning to the cold start burner.

An air pipe supplies air to the cold start burner, and a measuring pump or an electromagnetic valve may be used to direct the fuel to the burn chamber.

BRIEF DESCRIPTION OF THE FIGURE

Further advantages and details of the invention are provided in the following detailed description, taken in conjunction with the single FIGURE which is a cross sectional view of the cold start burner of the invention, as well as a schematic view indicating how the cold start burner is connected to the exhaust system between the engine and the catalytic converter.

DETAILED DESCRIPTION OF THE INVENTION

In the FIGURE, the cold start burner is indicated generally by reference numeral 1. The burner includes a cylindrical or pot shaped combustion or "burn" chamber 2 which is arranged generally concentrically within a similarly shaped preheat chamber 3. A welded seam 4 seals the annular space 5 thus providing thermal isolation. Pressurized air is supplied by an air supply 400 through the supply tube 6 to the annular space 5. Air within the annular space 5 enters the top 8 of the burn chamber 2 via air intake holes 7 provided in the wall of the burn chamber 2. A woven stiff fiberglass mat covering 9 is provided along the top and upper side surfaces inside the burn chamber. A fuel injection intake 10 supplies the fuel from a fuel tank 100 directly to the cold start burner 1. The fuel may be, for example, gas, gasoline, petroleum, burnable alcohol, heating oil, Methanol, ethyl-alcohol or other burnable liquids. Alternatively, gas, diesel or other fuel used by the vehicle's engine may be diverted by a regulating pump or an electromagnetic valve from the vehicle's fuel tank to the burn chamber 2. A spark plug 11 provides a very long lasting, practical spark, with an effective clean burn. A pipe 13 is attached (e.g., welded—see the weld indicated by reference numeral 15) within the combustion chamber 8 in the vicinity of the opening 12 of the burn chamber 2 to form a reservoir 14 near the connection between the preheater 1 and the exhaust conduit 16. Fuel reservoir 14 prevents unburned fuel in the burn chamber 2 from entering the exhaust system 16 and from travelling in the direction 17 of the exhaust towards the catalytic converter 300.

The FIGURE shows the pot shaped burn chamber 8 positioned concentrically within the similarly shaped casing 3. However, the chamber 8 and casing 3 may be any shape provided there is a gap therebetween allowing passage of air into the burn chamber 2. The cold start burner 1 is shown to be tightly fitted (e.g., pressure fitted) in the pipe 18 of the exhaust pipe 16. This could also be accomplished with an interior thread, the lower end of the burn chamber 2 being provided with male threads and the pipe 18 with female threads in order to tightly secure the chamber 2 and the pipe 18 together so that the necessary tight fit is obtained.

The cold start burner of the present invention may be switched on by use of a starter cable attached to an engine starter circuit 600 of the vehicle's engine, and switching off could be regulated by a time relay and or a temperature sensor 200 which is connected between the cold start burner and the catalytic converter and which is controlled by a control device 500. The cold start burner 1 could also be turned on by connecting it, for example, to the door locks of the vehicle to allow sufficient preheating time prior to ignition.

The instant invention has been shown and described herein in what are considered to be the most practical and preferred embodiments. It is recognized, however, that departures may be made therefrom and still fall within the scope of the invention, and that obvious modifications will occur to a person of ordinary skill in the art.

I claim:

1. A catalytic converter preheater, comprising:
    a first chamber means for conveying a flow of air from an air source to the preheater;
    a second chamber means for housing combustion disposed concentrically within said first chamber means, said second chamber means being defined by at least one sidewall defining air duct means communicating the first chamber means with the second chamber means;
    means for supplying combustion fuel to said second chamber means;
    means for dispersing fuel generally evenly throughout at least a portion of said second chamber means, said means for dispersing including excess fuel reservoir means; and
    means for igniting said fuel and air within said second chamber means,
    wherein air in the first chamber means cools the combustion chamber means sidewall, resulting in a relatively cool first chamber means exterior sidewall and preheated air upon entry into said combustion chamber means.

2. The preheater of claim 1, further comprising an exhaust outlet means communicating the combustion chamber means with a flow of engine exhaust gas upstream of a catalytic converter.

3. The preheater of claim 1, wherein fuel is supplied via said means for supplying fuel directly from a vehicle fuel tank and not through an engine operated fuel pump.

4. The preheater of claim 1, wherein the air duct means are spaced from said means for dispersing within said second chamber means.

5. The preheater of claim 1, wherein said means for dispersing comprises a woven fiberglass matting.

6. A catalytic converter preheater, comprising:
    a means for preheating an in-coming flow of air, including a preheat chamber communicated fluidly with a supply of said air;
    a means for combusting a fuel/air mixture including a combustion chamber disposed generally concentrically within said preheat chamber;
    a means communicating said preheat chamber with said combustion chamber to permit said air to enter said combustion chamber;
    means for supplying fuel to said combustion chamber;
    means for dispersing said fuel at least partially throughout said combustion chamber;
    means for igniting said air/fuel mixture within said combustion chamber;
    an excess fuel reservoir for collecting non-combusted fuel; and
    means for exhausting preheater combustion exhaust from said combustion chamber into an exhaust system conduit (s) upstream of an exhaust emission control device.

7. The preheater of claim 6, further comprising means for commencing and terminating operation of the preheater responsive to the engagement of an engine starter circuit of a motorized vehicle.

8. The preheater of claim 6, further comprising means for commencing and terminating operation of the preheater responsive to the temperature of exhaust gas upstream of a catalytic converter.

9. The preheater of claim 6, wherein said means for dispersing comprises woven fiberglass matting.

10. The preheater of claim 6, wherein said means for supplying fuel is connected directly to a vehicle fuel tank and is not associated with a mechanical engine fuel pump of a vehicle in which the preheater is used.

* * * * *